3,287,233
PROCESS FOR MANUFACTURE OF
JAVEL EXTRACTS
Jean Aigueperse, Grenoble, and Jean Barjhoux, Vizille, France, assignors to Societe d'Electro-Chimie, d'Electro-Metallurgie et des Acieries Electriques d'Ugine, Paris, France, a corporation of France
Filed Dec. 19, 1963, Ser. No. 331,723
Claims priority, application France, Dec. 20, 1962, 919,295
4 Claims. (Cl. 252—187)

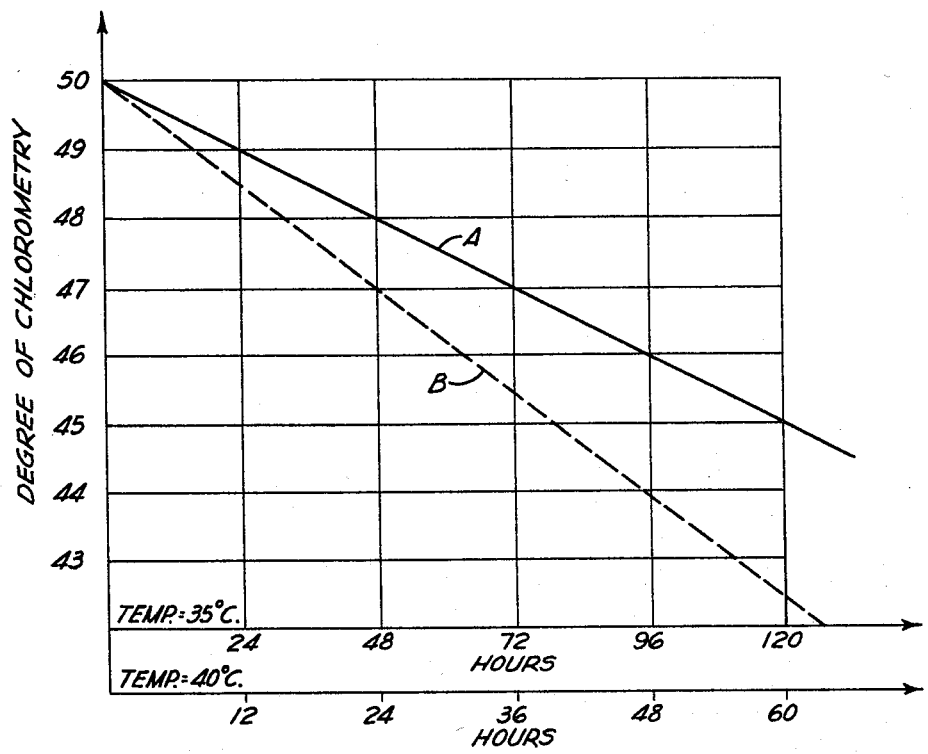
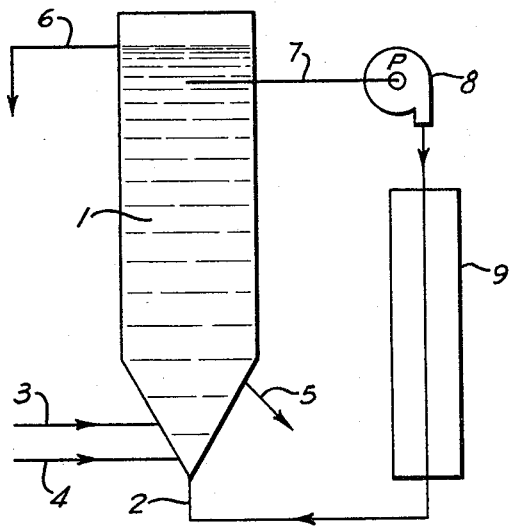
INVENTORS.
JEAN AIGUEPERSE
JEAN BARJHOUX
BY Webb, Mackey + Burden
ATTORNEYS.

The present invention relates to commercial Javel extracts of ameliorated quality and processes for manufacture of same.

Sodium hypochlorite solutions whose grade is between 30 and 70 chlorometric degrees, and generally between 47 and 50 degrees, are known as commercial Javel extracts. In this specification, the expression "concentrated Javel extract" designates sodium hypochlorite solutions whose grade is between 70 and 140 chlorometric degrees.

It is known to prepare commercial Javel extracts by reacting pure or diluted gaseous chlorine with aqueous sodium hydroxide solutions of suitable concentration, continuously or discontinuously. For example, the commercial extract of 50 chlorometric degrees is obtained directly by chlorination of a sodium hydroxide solution at 220 g./l. The product is a solution whose density is about 1.22 and includes 166 g./l. of sodium hypochlorite NaOCl and about 131 g./l. of sodium chloride.

The reaction is the following:

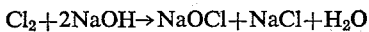

The molar ratio NaOCl/NaCl in the commercial Javel extracts is equal to 1, as a rule. In fact, this ratio is slightly inferior to this value due to decomposition of NaOCl which begins as soon as the formation of the hypochlorite is completed, and which produces either sodium chloride and sodium chlorate, or sodium chloride and oxygen, according to the reactions:

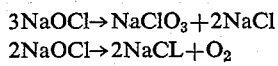

These decomposition reactions proceed more or less slowly, and entail a reduction of the available chlorine quantity. Consequently, ability to store and conserve Javel extracts is dependent upon its stability and this stability is an important characteristic for those who use it.

Numerous factors which influence the decomposition speed of the sodium hypochlorite solutions have been determined. It is known that this speed increases according to the hypochlorite concentration and according to the temperature. Additionally, the decomposition is catalyzed by a great number of metallic salts, chiefly the heavy metals salts. It is also known that there exists an optimum concentration of free sodium hydroxide in these solutions. The knowledge of these different factors has permitted progressive amelioration of stability of the commercial Javel extracts.

Our invention concerns commercial Javel extracts which have a greater stability, a lower density, and a molar ratio NaOCl/NaCl higher than the products of the same chlorometric grade obtained by known processes, as well as processes for the manufacture of these extracts.

To obtain these extracts according to our invention, a concentrated Javel extract of a grade between 70 and 140 chlorometric degrees, is prepared, and in the course of preparation of the concentrated Javel extract, sodium chloride which precipitates is separated therefrom. Then, a dilution of the concentrated extract with water is carried out to obtain the commercial Javel extracts of the desired grade.

Separation of the sodium chloride in the course of the production of the commercial extracts raises their molar ratio NaOCl/NaCl and reduces their density. The products of the invention have a molar ratio NaOCl/NaCl from 1 to 6, and a density from about 1.07 to 1.22, according to the chlorometric degree of the commercial extract and the chlorometric degree of the concentrated extract from which the former is made.

A study of the solubility curves of sodium chloride in solutions of sodium hypochlorite, eventually slightly alkaline, forecasts that solutions obtained by dilution of a product whose concentration was superior to 70 chlorometric degrees and free from the precipitated sodium chloride would have a lower density and a molar ratio NaOCl/NaCl notably superior to 1. But these improved properties did not arouse interest because their obtention carried along manufacturing complications, without a possibility of foreseeing improvement in stability of the obtained commercial products. To our surprise, we noticed that commercial Javel extracts obtained according to the invention have a better stability compared to a product of the same chlorometric grade obtained with the same reactives and in the usual manner, other things being equal. This improvement regarding stability reaches to 35% according to the commercial extract grade and the temperature.

FIGURE 1 shows a loss of grade in the extract due to time, on the one hand by curve A which represents an extract of 50 chlorometric degrees produced according to the invention, and on the other hand by curve B which represents another extract of 50 chlorometric degrees obtained by a conventional process. Both extracts were made from gaseous chlorine of the same compositions and of the same sample of sodium hydroxide solution. The ordinate shows the successive grades of commercial Javel extracts and the abscissas show two time scales, one from 0 to 120 hours and corresponding to a temperature of 35° C. for evaluation of the stability, and the other from 0 to 60 hours and corresponding to a temperature of 40° C. for evaluation of the stability. These temperatures which are rather high, have been chosen to point out the difference in stability between the product obtained according to the invention and a product obtained by conventional methods.

The process of our invention includes preparation of a concentrated Javel extract at 70–140 chlorometric degrees. Several processes have already been proposed for the obtention of extracts of concentration superior to 50 chlorometric degrees.

A first process comprises submitting usual Javel extracts to a vacuum evaporation, at a temperature sufficiently low to avoid hypochlorite decomposition. Practically, the evaporation must be done in vacuum, between 10 and 20 mm. of mercury, and the temperature must not exceed 35° C. As a consequence, this process is not economically attractive, both in regard to energy requirements and to apparatus requirements.

A second process includes passing chlorine into a sodium hydroxide solution of a concentration such that the Javel extract obtained has a grade between 70 and 140 chlorometric degrees at the end of the reaction. In this process, chlorination of an NaOH solution at 430 g./l. by pure or diluted chlorine leads to a Javel extract of 100 chlorometric degrees. As soon as the grade reaches a value of about 70 chlorometric degrees, the solution becomes cloudy and the chlorination is continued in a suspension which becomes denser and denser with fine crystals of sodium chloride.

A third process relates to a commercial Javel extract which is enriched in NaOH by addition of anhydrous sodium hydroxide or a concentrated hydroxide solution.

In these three processes, the sodium chloride precipitates in fine crystals and this form of precipitation constitutes a major disadvantage. On account of its fineness, this salt is difficult to extract from the apparatus, to separate from solutions, and, chiefly, after draining it retains notable quantities of mother-waters thereby effecting a loss of available chlorine.

Accordingly, we prefer a new process which is included in our invention and which overcomes the above problems. It comprises continuously reacting chlorine and sodium hydroxide in a suspension of sodium chloride crystals maintained in a fluidized bed and under such conditions that precipitation of sodium chloride effected by the reaction is essentially made with increase in size of the crystals which constitute the fluidized bed, and preferentially with a precipitation as separated fine particles. According to the process, a continous current of an hypochlorite solution of the final desired grade is introduced at the bottom of a vertical reactor used as crystallizing apparatus and containing a suspension of sodium chloride crystals of a suitably chosen granulometry. This solution rises up in the crystallizing reactor by maintaining in suspension in the fluidized bed the crystals on which takes place the greatest part of the sodium chloride precipitation. Gaseous chlorine, diluted or pure, and a quantity of a sodium hydroxide solution, that substantially stoichiometrically required, are injected into the bottom of the reactor. From the top of the reactor, we recover the desired clear solution, on the one hand, and on the other hand, the necessary solution to provide the continuous current of the hypochlorite solution which is injected into the bottom of the reactor after its passage through a cooling apparatus.

Pursuant to the invention, precipitation of the sodium chloride resulting from the reaction continuously takes place in the vicinity of the solid crystals which constitute the bed, and preferably upon these crystals, which increase in size. The crystals which have reached a sufficient dimension travel progressively down towards the bottom of the bed, and it is easy to withdraw from this area the big grains or crystals of regular sizes. After draining, these grains include only small quantities of mother-waters, less than 3%.

To avoid formation of fine particles in excessive quantities, the whole of the volume of the reactor is filled by the fluid bed. Additionally, the surface of the crystals which form the fluidized bed must be large enough to allow the greatest part of the sodium chloride which precipitates to cooperate and increase the size of the grains or crystals while taking into account the speed of increase in size of the sodium chloride crystals.

The average granulometry of the fluidized bed is not critical, but sizes of grains between 0.5 and 4 mm. are particularly recommended.

The cooling apparatus, which is traversed by the solution taken from the top of the reactor and introduced again at the bottom, is used to eliminate calories or heat produced by the reaction. This is a preferred way to eliminate this heat, but one can stay within the invention's limits if, instead of a cooling apparatus outside of the reactor, a means of cooling is placed inside the reactor. The temperature is maintained under 35° C., preferably under 30° C. in the whole of the liquid circuit.

The output of the recycled solution is not critical; however, it corresponds to the desired dimensions of the extracted crystals. The rate of flow of the solution delivered to the reactor is less than that rate at which some crystals of sodium chloride are carried away in the finished product extracted from the top of the reactor, and at least that rate which is required to maintain the sodium chloride crystals in a stable, fluidized bed.

The concentration of the sodium hydroxide solution introduced into the bottom of the reactor corresponds to the desired grade of the extracted product and is determined by this grade. It is thus possible to obtain all the concentrated Javel extracts of a grade comprised between 70 and 140 chlorometric degrees.

Above 140 chlorometric degrees, precipitation of $NaOCl5H_2O$ is encountered and the solutions become very unstable.

The dilution operation to obtain the commercial Javel extract according to the invention is easily done by addition of water in suitable apparatus. It is possible to execute the dilution in an amount to obtain the product of the desired grade. The dilution being an extremely simple operation, it may be done independently of the fabrication. Furthermore, it may be carried out after transportation of the concentrated extract to its place of use.

The following, non-limitative examples illustrate our invention.

EXAMPLE 1

According to one preferred practice, we prepare the concentrated Javel extract from which is obtained the commercial product according to the invention in apparatus schematically shown in FIGURE 2.

This apparatus comprises a crystallizing reactor 1 at the bottom of which a recycled hypochlorite solution of 100 chlorometric degrees is introduced by conduit 2, gaseous chlorine is added by a line 3 and a sodium hydroxide solution is delivered by a line 4. The large sodium chloride crystals which have formed are withdrawn through pipe 5. Near the top of the reactor, the finished product is extracted through pipe 6 and the solution to be recycled is removed by a line 7. A pump 8 effects extraction of the solution to be recycled and sends it back through a cooling apparatus 9 and then to the reactor 1 through the conduit 2.

The reactor had a diameter of 25 cm. and a height of 1.20 m. The sodium chloride crystals in suspension in the reactor had an average granulometry of about 1 mm. The output of the solution introduced at the bottom of the reactor was 1 m.$^3$/h. and the reactives were introduced continuously at the rate of 10 kg./h. for the chlorine and of 26.5 l./h. for the sodium hydroxide solution which has a concentration of 430 g./l. The solution to be recycled enters the cooling apparatus at 19° C. and exits therefrom at 14° C.

31 l./h. of Javel extract of 100 chlorometric degrees and 4.3 kg./h. of sodium chloride crystals of a granulometry of about 2 mm. were produced.

The dilution of the obtained extract was made in a tank equipped with an agitator. Mixing of one volume of Javel extract of 100 chlorometric degrees with one volume of water furnished a Javel extract of 50 chlorometric degrees.

This Javel extract of 50 chlorometric degrees produced according to the invention had a density of about 1.16. Its sodium hypochlorite content was 166 g./l. and the ratio NaOCl/NaCl was 2.25.

To point out the great stability of this Javel extract compared to the stability of Javel extracts furnished by the processes heretofore used, the following experiment was performed:

From the same reactives, two lots of Javel extracts of 50 chlorometric degrees were prepared:
  Product A according to the invention
  Product B by direct chlorination of a sodium hydroxide solution at 220 g./l.

These two Javel extracts were brought to the same potential of oxido-reduction so that the two extracts had the same quantity of free sodium hydroxide. Then a sample of each of them was disposed in a thermostat at 40° C. under the same lighting conditions.

The decomposition speeds of these two Javel extracts were compared and the results represented by the curves of the FIGURE 1. Whatever the temperature, when the product B (represented by curve B in dash line) lost three chlorometric degrees, the product A (represented by curve A in solid line) lost only 2 chlorometric degrees. The stability of product A was 33% greater than that of product B.

EXAMPLE 2

Apparatus similar to that described in Example 1 was used for this example. In the crystallizing reactor 1 a solution of a Javel extract whose grade was 120 chlorometric degrees was introduced at a rate of flow of 1.5 m.³/h., which maintained sodium chloride crystals of average granulometry of 2 mm. in a fluidized bed.

The reactives were injected continuously at the bottom of the fluidized bed at the rate of 10 kg./h. for the chlorine and 22 l./h. for the sodium hydroxide solution at 525 g./l. 26 l./h. of a Javel extract of 120 chlorometric degrees was produced, together with 5.8 kg./h. of crystallized sodium chloride of a granulometry of about 3 mm.

The dilution of five volumes of this concentrated extract from the reactor 1 by 7 volumes of water provided a Javel extract of 50 chlorometric degrees. The obtained extract, after dilution, had a density of about 1.13, a content of sodium hypochlorite of 166 g./l. and a ratio NaOCl/NaCl of 3.3.

A comparison of its stability with that of an extract obtained by a known process under the conditions described for Example 1, shows a stability advantage of 35% for the extract produced by this example.

While we have shown and described preferred embodiments of our invention, it may be otherwise embodied within the scope of the appended claims.

We claim:
1. A method for preparation of Javel extracts of substantially 30–70 chlorometric degrees, of a density between substantially 1.07 and 1.22, and of a molar ratio of NaOCl/NaCl between substantially 1.0 and 6.0 comprising preparing a concentrated Javel extract of substantially about 70–140 chlorometric degrees at a temperature less than 35° C. by contacting gaseous chlorine and an aqueous solution of sodium hydroxide, during preparation of said concentrated Javel extract separating a part of sodium chloride, which forms during said preparation, from said concentrated extract, thereafter diluting said concentrated Javel extract with water in an amount sufficient to obtain said Javel extract of a given chlorometric degree between 30–70.

2. A method for production of Javel extracts of substantially 30–70 chlorometric degrees, of a density between substantially 1.07 and 1.22, and of a molar ratio of NaOCl/NaCl between substantially 1.0 and 6.0 comprising preparing a concentrated Javel extract of a given chlorometric degree between 70 and 140 by forming and maintaining a fluidized bed of a suspension of sodium chloride crystals having an average granulometry between substantially about 0.5 and 4 mm. by flowing upwardly through said sodium chloride crystals a concentrated Javel extract solution of said given chlorometric degree at a rate which is less than that rate at which sodium chloride crystals are carried out of said bed and which is at least that rate required to maintain said fluidized bed, injecting gaseous chlorine and a sodium hydroxide solution into said concentrated Javel extract solution before it reaches said fluidized bed thereby reacting chlorine and sodium hydroxide and causing sodium chloride to precipitate upon said sodium chloride crystals, removing from said fluidized bed a solution of concentrated Javel extract of said given chlorometric degree and removing from said bed sodium chloride crystals which have increased in size from sodium chloride precipitation thereupon and which have fallen to the bottom of said bed, diluting said concentrated Javel extract removed from said fluidized bed with water in an amount sufficient to obtain said Javel extract of a given chlorometric degree between 30–70, said fluidized bed having a temperature less than 35° C.

3. The method of claim 2 characterized by recycling through said fluidized bed a portion of said solution of concentrated Javel extract which has flowed therethrough.

4. The method of claim 2 characterized by said sodium hydroxide solution having a concentration such that sodium hydroxide therein is that amount substantially stoichiometrically required for said given chlorometric degree of said concentrated Javel extract.

References Cited by the Examiner
UNITED STATES PATENTS

| | | | |
|---|---|---|---|
| 1,694,711 | 12/1928 | Levine | 23—86 |
| 1,748,897 | 2/1930 | Oppe | 23—86 |
| 3,134,641 | 5/1964 | Gleichert | 252—187 |

OTHER REFERENCES

"The Condensed Chemical Dictionary," 4th Ed., 1950 (page 607 relied on).

LEON D. ROSDOL, *Primary Examiner.*

JULIUS GREENWALD, *Examiner.*

M. WEINBLATT, *Assistant Examiner.*